(12) United States Patent
Johnson

(10) Patent No.: US 7,938,966 B2
(45) Date of Patent: May 10, 2011

(54) BACKWASH METHOD

(75) Inventor: Warren Thomas Johnson, New South Wales (AU)

(73) Assignee: Siemens Water Technologies Corp., Warrendale, PA (US)

( * ) Notice: Subject to any disclaimer, the term of this patent is extended or adjusted under 35 U.S.C. 154(b) by 420 days.

(21) Appl. No.: 10/530,900

(22) PCT Filed: Oct. 10, 2003

(86) PCT No.: PCT/AU03/01338
§ 371 (c)(1),
(2), (4) Date: Apr. 11, 2005

(87) PCT Pub. No.: WO2004/033078
PCT Pub. Date: Apr. 22, 2004

(65) Prior Publication Data
US 2006/0000774 A1    Jan. 5, 2006

(30) Foreign Application Priority Data

Oct. 10, 2002  (AU) ............................... 2002951974
Oct. 11, 2002  (AU) ............................... 2002952048

(51) Int. Cl.
B01D 65/02      (2006.01)
B01D 63/00      (2006.01)
C02F 1/44       (2006.01)

(52) U.S. Cl. ............. 210/636; 210/321.69; 210/321.88; 210/321.79

(58) Field of Classification Search ................. 210/636, 210/321.69, 321.88, 321.79
See application file for complete search history.

(56) References Cited

U.S. PATENT DOCUMENTS 256,008  A    4/1882  Leak
285,321  A    9/1883  Tams
(Continued)

FOREIGN PATENT DOCUMENTS

AU    34400/84    9/1983
(Continued)

OTHER PUBLICATIONS

Supplementary European Search Report (EP 03 74 7731) dated Mar. 15, 2007.

(Continued)

*Primary Examiner* — Walter D Griffin
*Assistant Examiner* — Denise R Anderson

(57) ABSTRACT

A filtration arrangement including one or more membrane modules (5) positioned vertically within a feed tank (6), each membrane module (5) having one or more membranes positioned therein. An aeration hood (10) having an upper wall (11) and one or more downwardly extending side walls (12, 13) is configured to at least partially shroud the membrane modules (5) within the tank (6). The aeration hood (10) includes a number of open-ended tubes (14), each extending downwardly from the upper wall (11) and forming a respective opening (15) therein. Each tube (14) is adapted to have at least one of the modules (5) mounted therein and extending through the respective openings (15) in the upper wall (11) so as to at least partially surround an outer periphery of an associated module or modules (5). One or more aeration openings (17) are provided in each tube (14) at a location spaced from a proximal end of the tube (16). The aeration hood side wall or walls (12, 13) extend to below the location of the aeration openings (17) in the tubes (14). Gas providing means (18) feed gas into the hood (10).

25 Claims, 2 Drawing Sheets

U.S. PATENT DOCUMENTS

| | | |
|---|---|---|
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,139,401 A | 6/1964 | Hach |
| 3,183,191 A | 5/1965 | Hach |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Killsman |
| 3,472,765 A | 10/1969 | Okey et al. |
| 3,492,698 A | 2/1970 | Geary et al. |
| 3,501,798 A | 3/1970 | Bray |
| 3,505,215 A | 4/1970 | Bray |
| 3,556,305 A | 1/1971 | Shorr |
| 3,591,010 A | 7/1971 | Pall et al. |
| 3,625,827 A | 12/1971 | Wildi et al. |
| 3,654,147 A | 4/1972 | Levin et al. |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hall et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Ammadio et al. |
| 4,105,731 A | 8/1978 | Yamazaki |
| 4,107,043 A | 8/1978 | McKinney |
| 4,138,460 A | 2/1979 | Tigner |
| 4,183,890 A | 1/1980 | Bollinger |
| 4,188,817 A | 2/1980 | Steigelmann |
| 4,190,411 A | 2/1980 | Fujimoto |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,315,819 A | 2/1982 | King et al. |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Müller |
| 4,519,909 A | 5/1985 | Castro |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A * | 10/1989 | Ohkubo et al. .......... 210/321.69 |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,963,304 A | 10/1990 | Im et al. |
| 4,968,430 A | 11/1990 | Hildenbrand et al. |
| 4,968,733 A | 11/1990 | Muller et al. |
| 4,969,997 A | 11/1990 | Klüver et al. |
| 4,988,444 A | 1/1991 | Applegate et al. |
| 4,999,038 A | 3/1991 | Lundberg |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Müller et al. |
| 5,066,402 A | 11/1991 | Anselme et al. |

| | | | |
|---|---|---|---|
| 5,069,065 A | 12/1991 | Sprunt et al. | |
| 5,069,353 A | 12/1991 | Espenan | |
| 5,075,065 A | 12/1991 | Effenberger et al. | |
| 5,076,925 A | 12/1991 | Roesink et al. | |
| 5,079,272 A | 1/1992 | Allegrezza et al. | |
| 5,094,750 A | 3/1992 | Kopp et al. | |
| 5,094,867 A | 3/1992 | Detering et al. | |
| 5,098,567 A | 3/1992 | Nishiguchi | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth, III et al. | |
| 5,137,631 A | 8/1992 | Eckman et al. | |
| 5,138,870 A | 8/1992 | Lyssy | |
| 5,147,553 A | 9/1992 | Waite | |
| 5,151,191 A | 9/1992 | Sunaoka et al. | |
| 5,151,193 A | 9/1992 | Grobe et al. | |
| 5,158,721 A | 10/1992 | Allegrezza, Jr. et al. | |
| 5,169,528 A | 12/1992 | Karbachsch et al. | |
| 5,169,530 A | 12/1992 | Schucker et al. | |
| 5,182,019 A | 1/1993 | Cote et al. | |
| 5,186,821 A | 2/1993 | Murphy | |
| 5,192,442 A | 3/1993 | Piccirillo et al. | |
| 5,192,456 A | 3/1993 | Ishida et al. | |
| 5,192,478 A | 3/1993 | Caskey | |
| 5,194,149 A | 3/1993 | Selbie et al. | |
| 5,198,116 A | 3/1993 | Comstock et al. | |
| 5,198,162 A | 3/1993 | Park et al. | |
| 5,209,852 A * | 5/1993 | Sunaoka et al. | 210/636 |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A | 9/1993 | Cote et al. | |
| 5,262,054 A | 11/1993 | Wheeler | |
| 5,271,830 A | 12/1993 | Faivre et al. | |
| 5,275,766 A | 1/1994 | Gadkaree et al. | |
| 5,286,324 A | 2/1994 | Kawai et al. | |
| 5,290,451 A | 3/1994 | Koster et al. | |
| 5,290,457 A | 3/1994 | Karbachsch et al. | |
| 5,297,420 A | 3/1994 | Gilliland et al. | |
| 5,316,671 A | 5/1994 | Murphy | |
| 5,320,760 A | 6/1994 | Freund et al. | |
| 5,353,630 A | 10/1994 | Soda et al. | |
| 5,354,470 A | 10/1994 | Seita et al. | |
| 5,358,732 A | 10/1994 | Seifter et al. | |
| 5,361,625 A | 11/1994 | Ylvisaker | |
| 5,364,527 A | 11/1994 | Zimmermann et al. | |
| 5,364,529 A | 11/1994 | Morin et al. | |
| 5,374,353 A | 12/1994 | Murphy | |
| 5,389,260 A | 2/1995 | Hemp et al. | |
| 5,393,433 A | 2/1995 | Espenan et al. | |
| 5,396,019 A | 3/1995 | Sartori et al. | |
| 5,401,401 A | 3/1995 | Hickok et al. | |
| 5,401,405 A | 3/1995 | Loker | |
| 5,403,479 A | 4/1995 | Smith et al. | |
| 5,405,528 A | 4/1995 | Selbie et al. | |
| 5,411,663 A | 5/1995 | Johnson | |
| 5,417,101 A | 5/1995 | Weich | |
| 5,419,816 A | 5/1995 | Sampson et al. | |
| 5,451,317 A | 9/1995 | Ishida et al. | |
| 5,458,779 A | 10/1995 | Odegaard | |
| 5,468,397 A | 11/1995 | Barboza et al. | |
| 5,470,469 A | 11/1995 | Eckman | |
| 5,477,731 A | 12/1995 | Mouton | |
| 5,479,590 A | 12/1995 | Lin | |
| 5,480,553 A | 1/1996 | Yamamori et al. | |
| 5,482,625 A | 1/1996 | Shimizu et al. | |
| 5,484,528 A | 1/1996 | Yagi et al. | |
| 5,490,939 A | 2/1996 | Gerigk et al. | |
| 5,491,023 A | 2/1996 | Tsai et al. | |
| 5,501,798 A | 3/1996 | Al-Samadi et al. | |
| 5,525,220 A | 6/1996 | Yagi et al. | |
| 5,531,848 A | 7/1996 | Brinda et al. | |
| 5,531,900 A | 7/1996 | Raghavan et al. | |
| 5,543,002 A | 8/1996 | Brinda et al. | |
| 5,552,047 A | 9/1996 | Oshida et al. | |
| 5,554,283 A | 9/1996 | Brinda et al. | |
| 5,556,591 A | 9/1996 | Jallerat et al. | |
| 5,575,963 A | 11/1996 | Soffer et al. | |
| 5,597,732 A | 1/1997 | Bryan-Brown | |
| 5,607,593 A * | 3/1997 | Cote et al. | 210/650 |
| 5,633,163 A | 5/1997 | Cameron | |
| 5,639,373 A | 6/1997 | Mahendran et al. | |
| 5,643,455 A | 7/1997 | Kopp et al. | |
| 5,647,988 A | 7/1997 | Kawanishi et al. | |
| 5,670,053 A | 9/1997 | Collentro et al. | |
| 5,677,360 A | 10/1997 | Yamamori et al. | |
| 5,688,460 A | 11/1997 | Ruschke | |
| 5,733,456 A | 3/1998 | Okey et al. | |
| 5,744,037 A | 4/1998 | Fujimura et al. | |
| 5,747,605 A | 5/1998 | Breant et al. | |
| 5,766,479 A | 6/1998 | Collentro et al. | |
| 5,783,083 A | 7/1998 | Henshaw et al. | |
| 5,843,069 A | 12/1998 | Butler et al. | |
| 5,846,424 A | 12/1998 | Khudenko | |
| 5,871,823 A | 2/1999 | Anders et al. | |
| 5,888,401 A | 3/1999 | Nguyen | |
| 5,895,570 A | 4/1999 | Liang | |
| 5,906,739 A * | 5/1999 | Osterland et al. | 210/321.81 |
| 5,906,742 A | 5/1999 | Wang et al. | |
| 5,910,250 A * | 6/1999 | Mahendran et al. | 210/636 |
| 5,914,039 A | 6/1999 | Mahendran et al. | |
| 5,918,264 A | 6/1999 | Drummond et al. | |
| 5,942,113 A | 8/1999 | Morimura | |
| 5,944,997 A | 8/1999 | Pedersen et al. | |
| 5,951,878 A | 9/1999 | Astrom | |
| 5,958,243 A | 9/1999 | Lawrence et al. | |
| 5,961,830 A | 10/1999 | Barnett | |
| 5,968,357 A | 10/1999 | Doelle et al. | |
| 5,988,400 A | 11/1999 | Karachevtcev et al. | |
| 5,989,428 A | 11/1999 | Goronszy | |
| 5,997,745 A | 12/1999 | Tonelli et al. | |
| 6,001,254 A | 12/1999 | Espenan | |
| 6,007,712 A | 12/1999 | Tanaka et al. | |
| 6,017,451 A | 1/2000 | Kopf | |
| 6,024,872 A | 2/2000 | Mahendran | |
| 6,036,030 A | 3/2000 | Stone et al. | |
| 6,039,872 A | 3/2000 | Wu et al. | |
| 6,042,677 A | 3/2000 | Mahendran et al. | |
| 6,045,698 A * | 4/2000 | Cote et al. | 210/636 |
| 6,045,899 A | 4/2000 | Wang et al. | |
| 6,048,454 A | 4/2000 | Jenkins | |
| 6,048,455 A | 4/2000 | Janik | |
| 6,066,401 A | 5/2000 | Stilburn | |
| 6,074,718 A | 6/2000 | Puglia et al. | |
| 6,077,435 A | 6/2000 | Beck et al. | |
| 6,083,393 A | 7/2000 | Wu et al. | |
| 6,096,213 A | 8/2000 | Radovanovic et al. | |
| 6,113,782 A | 9/2000 | Leonard | |
| 6,120,688 A | 9/2000 | Daly et al. | |
| 6,126,819 A | 10/2000 | Heine et al. | |
| 6,146,747 A | 11/2000 | Wang et al. | |
| 6,149,817 A | 11/2000 | Peterson et al. | |
| 6,156,200 A | 12/2000 | Zha et al. | |
| 6,159,373 A | 12/2000 | Beck et al. | |
| 6,193,890 B1 | 2/2001 | Pedersen et al. | |
| 6,202,475 B1 | 3/2001 | Selbie et al. | |
| 6,214,231 B1 | 4/2001 | Cote et al. | |
| 6,214,232 B1 * | 4/2001 | Baurmeister et al. | 210/651 |
| 6,221,247 B1 | 4/2001 | Nemser et al. | |
| 6,245,239 B1 | 6/2001 | Cote et al. | |
| 6,254,773 B1 | 7/2001 | Biltoft | |
| 6,264,839 B1 | 7/2001 | Mohr et al. | |
| 6,277,512 B1 | 8/2001 | Hamrock et al. | |
| 6,280,626 B1 * | 8/2001 | Miyashita et al. | 210/636 |
| 6,284,135 B1 * | 9/2001 | Ookata | 210/220 |
| 6,290,756 B1 | 9/2001 | Macheras et al. | |
| 6,294,039 B1 | 9/2001 | Mahendran et al. | |
| 6,299,773 B1 | 10/2001 | Takamura et al. | |
| 6,303,026 B1 | 10/2001 | Lindbo | |
| 6,303,035 B1 * | 10/2001 | Cote et al. | 210/636 |
| 6,315,895 B1 | 11/2001 | Summerton et al. | |
| 6,319,411 B1 | 11/2001 | Cote | |
| 6,322,703 B1 | 11/2001 | Taniguchi et al. | |
| 6,325,928 B1 | 12/2001 | Pedersen et al. | |
| 6,325,938 B1 | 12/2001 | Miyashita et al. | |
| 6,337,018 B1 | 1/2002 | Mickols | |
| RE37,549 E | 2/2002 | Mahendran et al. | |

| Patent | Kind | Date | Inventor |
|---|---|---|---|
| 6,349,835 | B1 | 2/2002 | Saux et al. |
| 6,354,444 | B1 | 3/2002 | Mahendran |
| 6,361,695 | B1 | 3/2002 | Husain et al. |
| 6,368,819 | B1 | 4/2002 | Gaddy et al. |
| 6,372,138 | B1 | 4/2002 | Cho et al. |
| 6,375,848 | B1 | 4/2002 | Cote et al. |
| 6,383,369 | B2 | 5/2002 | Elston |
| 6,387,189 | B1 | 5/2002 | Gröschl et al. |
| 6,402,955 | B2 * | 6/2002 | Ookata ............... 210/636 |
| 6,406,629 | B1 | 6/2002 | Husain et al. |
| 6,423,214 | B1 | 7/2002 | Lindbo |
| 6,423,784 | B1 | 7/2002 | Hamrock et al. |
| 6,432,310 | B1 | 8/2002 | Andou et al. |
| 6,440,303 | B2 | 8/2002 | Spriegel |
| D462,699 | S | 9/2002 | Johnson et al. |
| 6,444,124 | B1 | 9/2002 | Onyeche et al. |
| 6,468,430 | B1 | 10/2002 | Kimura et al. |
| 6,485,645 | B1 | 11/2002 | Husain et al. |
| 6,495,041 | B2 | 12/2002 | Taniguchi et al. |
| 6,517,723 | B1 | 2/2003 | Daigger et al. |
| 6,524,481 | B2 | 2/2003 | Zha et al. |
| 6,524,733 | B1 | 2/2003 | Nonobe |
| 6,550,747 | B2 | 4/2003 | Rabie et al. |
| 6,555,005 | B1 | 4/2003 | Zha et al. |
| 6,562,237 | B1 | 5/2003 | Olaopa |
| 6,576,136 | B1 * | 6/2003 | De Moel et al. ............... 210/636 |
| 6,592,762 | B2 | 7/2003 | Smith |
| D478,913 | S | 8/2003 | Johnson et al. |
| 6,613,222 | B2 | 9/2003 | Mikkelson et al. |
| 6,620,319 | B2 | 9/2003 | Behmann et al. |
| 6,627,082 | B2 | 9/2003 | Del Vecchio |
| 6,632,358 | B1 * | 10/2003 | Suga et al. ............... 210/323.2 |
| 6,635,179 | B1 | 10/2003 | Summerton et al. |
| 6,641,733 | B2 * | 11/2003 | Zha et al. ............... 210/615 |
| 6,645,374 | B2 | 11/2003 | Cote et al. |
| 6,656,356 | B2 | 12/2003 | Gungerich et al. |
| 6,682,652 | B2 | 1/2004 | Mahendran et al. |
| 6,685,832 | B2 | 2/2004 | Mahendran et al. |
| 6,696,465 | B2 | 2/2004 | Dellaria et al. |
| 6,702,561 | B2 | 3/2004 | Stillig et al. |
| 6,706,189 | B2 | 3/2004 | Rabie et al. |
| 6,708,957 | B2 | 3/2004 | Cote et al. |
| 6,712,970 | B1 | 3/2004 | Trivedi |
| 6,721,529 | B2 | 4/2004 | Chen et al. |
| 6,723,758 | B2 | 4/2004 | Stone et al. |
| 6,727,305 | B1 | 4/2004 | Pavez Aranguiz |
| 6,743,362 | B1 | 6/2004 | Porteous et al. |
| 6,758,972 | B2 | 7/2004 | Vriens et al. |
| 6,770,202 | B1 | 8/2004 | Kidd et al. |
| 6,780,466 | B2 | 8/2004 | Grangeon et al. |
| 6,783,008 | B2 | 8/2004 | Zha et al. |
| 6,790,912 | B2 | 9/2004 | Blong |
| 6,805,806 | B2 | 10/2004 | Arnaud |
| 6,808,629 | B2 | 10/2004 | Wouters-Wasiak et al. |
| 6,811,696 | B2 | 11/2004 | Wang et al. |
| 6,814,861 | B2 | 11/2004 | Husain et al. |
| 6,821,420 | B2 | 11/2004 | Zha et al. |
| 6,830,782 | B2 | 12/2004 | Kanazawa |
| 6,841,070 | B2 | 1/2005 | Zha et al. |
| 6,861,466 | B2 | 3/2005 | Dadalas et al. |
| 6,863,817 | B2 | 3/2005 | Liu et al. |
| 6,863,818 | B2 | 3/2005 | Daigger et al. |
| 6,863,823 | B2 | 3/2005 | Côté |
| 6,869,534 | B2 | 3/2005 | McDowell et al. |
| 6,872,305 | B2 | 3/2005 | Johnson et al. |
| 6,881,343 | B2 | 4/2005 | Rabie et al. |
| 6,884,350 | B2 | 4/2005 | Muller |
| 6,884,375 | B2 | 4/2005 | Wang et al. |
| 6,890,435 | B2 | 5/2005 | Ji et al. |
| 6,890,645 | B2 | 5/2005 | Disse et al. |
| 6,893,568 | B1 | 5/2005 | Janson et al. |
| 6,899,812 | B2 | 5/2005 | Cote et al. |
| 6,946,073 | B2 | 9/2005 | Daigger et al. |
| 6,952,258 | B2 | 10/2005 | Ebert et al. |
| 6,955,762 | B2 | 10/2005 | Gallagher et al. |
| 6,962,258 | B2 | 11/2005 | Zha et al. |
| 6,964,741 | B2 | 11/2005 | Mahendran et al. |
| 6,969,465 | B2 | 11/2005 | Zha et al. |
| 6,974,554 | B2 | 12/2005 | Cox et al. |
| 6,994,867 | B1 | 2/2006 | Hossainy et al. |
| 7,005,100 | B2 | 2/2006 | Lowel |
| 7,014,763 | B2 | 3/2006 | Johnson et al. |
| 7,018,530 | B2 | 3/2006 | Pollock |
| 7,018,533 | B2 | 3/2006 | Johnson et al. |
| 7,022,233 | B2 | 4/2006 | Chen |
| 7,041,728 | B2 | 5/2006 | Zipplies et al. |
| 7,052,610 | B2 | 5/2006 | Janson et al. |
| 7,083,733 | B2 | 8/2006 | Freydina et al. |
| 7,087,173 | B2 | 8/2006 | Cote et al. |
| 7,147,777 | B1 | 12/2006 | Porteous |
| 7,147,778 | B1 | 12/2006 | DiMassimo et al. |
| 7,160,455 | B2 | 1/2007 | Taniguchi et al. |
| 7,160,463 | B2 | 1/2007 | Beck et al. |
| 7,160,464 | B2 | 1/2007 | Lee et al. |
| 7,172,699 | B1 | 2/2007 | Trivedi |
| 7,172,701 | B2 | 2/2007 | Gaid et al. |
| 7,186,344 | B2 | 3/2007 | Hughes |
| 7,208,091 | B2 | 4/2007 | Pind et al. |
| 7,223,340 | B2 | 5/2007 | Zha et al. |
| 7,226,541 | B2 | 6/2007 | Muller et al. |
| 7,247,238 | B2 | 7/2007 | Mullette et al. |
| 7,264,716 | B2 | 9/2007 | Johnson et al. |
| 7,279,100 | B2 | 10/2007 | Devine |
| 7,300,022 | B2 | 11/2007 | Muller |
| 7,314,563 | B2 | 1/2008 | Cho et al. |
| 7,329,344 | B2 | 2/2008 | Jordan et al. |
| 7,344,645 | B2 | 3/2008 | Beck et al. |
| 7,361,274 | B2 | 4/2008 | Lazaredes et al. |
| 7,378,024 | B2 | 5/2008 | Bartels et al. |
| 7,387,723 | B2 | 6/2008 | Jordan |
| 7,404,896 | B2 | 7/2008 | Muller et al. |
| 7,455,765 | B2 | 11/2008 | Elefritz et al. |
| 7,481,933 | B2 | 1/2009 | Barnes |
| 7,510,655 | B2 | 3/2009 | Barnes |
| 7,563,363 | B2 | 7/2009 | Kuzma |
| 7,591,950 | B2 | 9/2009 | Zha |
| 7,632,439 | B2 | 12/2009 | Mullette et al. |
| 7,713,413 | B2 | 5/2010 | Barnes |
| 7,718,057 | B2 | 5/2010 | Jordan |
| 7,718,065 | B2 | 5/2010 | Jordan |
| 7,722,769 | B2 | 5/2010 | Jordan |
| 2001/0047962 | A1 | 12/2001 | Zha et al. |
| 2001/0052494 | A1 | 12/2001 | Cote et al. |
| 2002/0070157 | A1 | 6/2002 | Yamada |
| 2002/0148767 | A1 | 10/2002 | Johnson et al. |
| 2002/0153313 | A1 | 10/2002 | Cote |
| 2002/0185435 | A1 | 12/2002 | Husain et al. |
| 2002/0189999 | A1 * | 12/2002 | Espenan et al. ............... 210/636 |
| 2003/0038080 | A1 | 2/2003 | Vriens et al. |
| 2003/0042199 | A1 | 3/2003 | Smith |
| 2003/0057155 | A1 | 3/2003 | Husain et al. |
| 2003/0121855 | A1 * | 7/2003 | Kopp ............... 210/650 |
| 2003/0127388 | A1 | 7/2003 | Ando et al. |
| 2003/0146153 | A1 | 8/2003 | Cote et al. |
| 2003/0150807 | A1 | 8/2003 | Bartels et al. |
| 2003/0159988 | A1 | 8/2003 | Daigger et al. |
| 2003/0178365 | A1 | 9/2003 | Zha et al. |
| 2003/0226797 | A1 | 12/2003 | Phelps |
| 2004/0007525 | A1 | 1/2004 | Rabie et al. |
| 2004/0035770 | A1 | 2/2004 | Edwards et al. |
| 2004/0084369 | A1 | 5/2004 | Zha et al. |
| 2004/0145076 | A1 | 7/2004 | Zha et al. |
| 2004/0168979 | A1 | 9/2004 | Zha et al. |
| 2004/0173525 | A1 | 9/2004 | Hunniford et al. |
| 2004/0178154 | A1 | 9/2004 | Zha et al. |
| 2004/0217053 | A1 | 11/2004 | Zha et al. |
| 2004/0232076 | A1 | 11/2004 | Zha et al. |
| 2004/0245174 | A1 * | 12/2004 | Takayama et al. ............... 210/636 |
| 2005/0029185 | A1 | 2/2005 | Muller |
| 2005/0029186 | A1 | 2/2005 | Muller |
| 2005/0032982 | A1 | 2/2005 | Muller et al. |
| 2005/0045557 | A1 | 3/2005 | Daigger et al. |
| 2005/0061725 | A1 | 3/2005 | Liu et al. |
| 2005/0098494 | A1 | 5/2005 | Mullette et al. |
| 2005/0103722 | A1 | 5/2005 | Freydina et al. |
| 2005/0109692 | A1 | 5/2005 | Zha et al. |
| 2005/0115880 | A1 | 6/2005 | Pollock |
| 2005/0115899 | A1 | 6/2005 | Liu et al. |

| | | | | | |
|---|---|---|---|---|---|
| 2005/0139538 A1 | 6/2005 | Lazaredes | JP | 56-121685 | 9/1981 |
| 2005/0194310 A1 | 9/2005 | Yamamoto et al. | JP | 57-190697 | 11/1982 |
| 2005/0194315 A1 | 9/2005 | Adams et al. | JP | 58-088007 | 5/1983 |
| 2006/0000775 A1 | 1/2006 | Zha et al. | JP | 60-019002 | 1/1985 |
| 2006/0081533 A1 | 4/2006 | Khudenko | JP | 60-206412 | 10/1985 |
| 2006/0131234 A1 | 6/2006 | Zha et al. | JP | 60-260628 | 12/1985 |
| 2006/0201876 A1 | 9/2006 | Jordan | JP | 61-097005 | 5/1986 |
| 2006/0249448 A1 | 11/2006 | Fujishima et al. | JP | 61-097006 | 5/1986 |
| 2006/0249449 A1 | 11/2006 | Nakhla et al. | JP | 61-107905 | 5/1986 |
| 2006/0261007 A1 | 11/2006 | Zha et al. | JP | 61-167406 | 7/1986 |
| 2006/0273007 A1 | 12/2006 | Zha et al. | JP | 61-167407 | 7/1986 |
| 2006/0273038 A1 | 12/2006 | Syed et al. | JP | 61-171504 | 8/1986 |
| 2007/0007205 A1 | 1/2007 | Johnson et al. | JP | 61-192309 | 8/1986 |
| 2007/0007214 A1 | 1/2007 | Zha et al. | JP | 61-222510 | 10/1986 |
| 2007/0045183 A1 | 3/2007 | Murphy | JP | 61-242607 | 10/1986 |
| 2007/0056905 A1 | 3/2007 | Beck et al. | JP | 61-249505 | 11/1986 |
| 2007/0075017 A1 | 4/2007 | Kuzma | JP | 61-257203 | 11/1986 |
| 2007/0075021 A1 | 4/2007 | Johnson | JP | 61-263605 | 11/1986 |
| 2007/0084791 A1 | 4/2007 | Jordan et al. | JP | 61-291007 | 12/1986 |
| 2007/0084795 A1 | 4/2007 | Jordan | JP | 61-293504 | 12/1986 |
| 2007/0108125 A1 | 5/2007 | Cho et al. | JP | 62-004408 | 1/1987 |
| 2007/0138090 A1 | 6/2007 | Jordan et al. | JP | 62-068828 | 3/1987 |
| 2007/0170112 A1 | 7/2007 | Elefritz et al. | JP | 62-114609 | 5/1987 |
| 2007/0227973 A1 | 10/2007 | Zha et al. | JP | 62-140607 | 6/1987 |
| 2008/0053923 A1 | 3/2008 | Beck et al. | JP | 62-144708 | 6/1987 |
| | | | JP | 62-163708 | 7/1987 |

FOREIGN PATENT DOCUMENTS

| | | | | | |
|---|---|---|---|---|---|
| AU | 55847/86 | 3/1985 | JP | 62-179540 | 8/1987 |
| AU | 77066/87 | 7/1986 | JP | 62-237908 | 10/1987 |
| AU | 762091 B2 * | 11/2000 | JP | 62-250908 | 10/1987 |
| CN | 1050770 C | 1/1995 | JP | 62-262710 | 11/1987 |
| CN | 1249698 A | 4/2000 | JP | 63-097634 | 4/1988 |
| CN | 1541757 A | 11/2004 | JP | 63-099246 | 4/1988 |
| DE | 3904544 A1 | 8/1990 | JP | 63-143905 | 6/1988 |
| DE | 4117281 A1 | 1/1992 | JP | 63-171607 | 7/1988 |
| DE | 4113420 A1 | 10/1992 | JP | 63-180254 | 7/1988 |
| DE | 4117422 C1 | 11/1992 | JP | S63-38884 | 10/1988 |
| DE | 29804927 U1 | 6/1998 | JP | 01-075542 | 3/1989 |
| DE | 29906389 | 6/1999 | JP | 06-027215 | 3/1989 |
| EP | 194735 | 9/1876 | JP | 01-151906 | 6/1989 |
| EP | 012577 B1 | 2/1983 | JP | 01-307409 | 12/1989 |
| EP | 126714 A2 | 11/1984 | JP | 02-026625 | 1/1990 |
| EP | 050447 B1 | 10/1985 | JP | 02-031200 | 2/1990 |
| EP | 250337 A1 | 12/1987 | JP | 02-040296 A | 2/1990 |
| EP | 327025 A1 | 8/1989 | JP | 02-107318 | 4/1990 |
| EP | 090383 B1 | 5/1990 | JP | 02-126922 | 5/1990 |
| EP | 407900 A2 | 1/1991 | JP | 02-144132 | 6/1990 |
| EP | 463627 A2 | 1/1992 | JP | 02-164423 | 6/1990 |
| EP | 492942 A2 | 7/1992 | JP | 02-241523 | 9/1990 |
| EP | 518250 B1 | 12/1992 | JP | 02-284035 | 11/1990 |
| EP | 547575 A1 | 6/1993 | JP | 2277528 A * | 11/1990 |
| EP | 395133 B1 | 2/1995 | JP | 02277528 A | 11/1990 |
| EP | 492446 B1 | 11/1995 | JP | 03-018373 | 1/1991 |
| EP | 430082 B1 | 6/1996 | JP | 03-028797 | 2/1991 |
| EP | 734758 A1 | 10/1996 | JP | 03-110445 | 5/1991 |
| EP | 763758 A1 | 3/1997 | JP | 04-108518 | 4/1992 |
| EP | 824956 A2 | 2/1998 | JP | 04-110023 | 4/1992 |
| EP | 855214 A1 | 7/1998 | JP | 04-187224 | 7/1992 |
| EP | 627255 B1 | 1/1999 | JP | 04-250898 | 9/1992 |
| EP | 911073 A1 | 4/1999 | JP | 04-256424 | 9/1992 |
| EP | 920904 A2 | 6/1999 | JP | 04-265128 | 9/1992 |
| EP | 1034835 A1 | 9/2000 | JP | 04-293527 | 10/1992 |
| EP | 1052012 A1 | 11/2000 | JP | 04-310223 | 11/1992 |
| EP | 1349644 | 10/2003 | JP | 04-334530 | 11/1992 |
| EP | 1350555 A1 | 10/2003 | JP | 04-348252 | 12/1992 |
| EP | 1236503 B1 | 8/2004 | JP | 05-023557 | 2/1993 |
| EP | 1659171 A | 5/2006 | JP | 05-096136 | 4/1993 |
| FR | 2620712 | 3/1989 | JP | 05-137977 | 6/1993 |
| FR | 2674448 | 10/1992 | JP | 05-157654 | 6/1993 |
| FR | 2699424 | 6/1994 | JP | 05-161831 | 6/1993 |
| FR | 2762834 A | 11/1998 | JP | 05-285348 | 11/1993 |
| GB | 702911 | 1/1954 | JP | 06-071120 | 3/1994 |
| GB | 2253572 A | 9/1992 | JP | 06-114240 | 4/1994 |
| JP | 54-162684 | 12/1979 | JP | 06-218237 | 8/1994 |
| JP | 55-129155 | 6/1980 | JP | 06-277469 | 10/1994 |
| JP | 55-099703 | 7/1980 | JP | 06-285496 | 10/1994 |
| JP | 55-129107 | 10/1980 | JP | 06-343837 | 12/1994 |
| JP | 56-021604 | 2/1981 | JP | 07-000770 | 1/1995 |
| JP | 56-118701 | 9/1981 | JP | 07-024272 | 1/1995 |
| | | | JP | 07-047247 | 2/1995 |

| | | |
|---|---|---|
| JP | 07-068139 | 3/1995 |
| JP | 07-136470 | 5/1995 |
| JP | 07-136471 | 5/1995 |
| JP | 07-155758 | 6/1995 |
| JP | 07-178323 | 7/1995 |
| JP | 07-185268 | 7/1995 |
| JP | 07-185271 | 7/1995 |
| JP | 07-236819 | 9/1995 |
| JP | 07-251043 | 10/1995 |
| JP | 07-275665 | 10/1995 |
| JP | 07-289860 | 11/1995 |
| JP | 07-303895 | 11/1995 |
| JP | 08-010585 | 1/1996 |
| JP | 09-072993 | 3/1997 |
| JP | 09-099227 | 4/1997 |
| JP | 09-141063 | 6/1997 |
| JP | 09-155345 | 6/1997 |
| JP | 09-187628 | 7/1997 |
| JP | 09-220569 | 8/1997 |
| JP | 09-271641 | 10/1997 |
| JP | 09-324067 | 12/1997 |
| JP | 10-024222 | 1/1998 |
| JP | 10-033955 | 2/1998 |
| JP | 10-048466 | 2/1998 |
| JP | 10076264 A * | 3/1998 |
| JP | 10-085565 | 4/1998 |
| JP | 10-156149 | 6/1998 |
| JP | 10-085562 | 7/1998 |
| JP | 10-180048 | 7/1998 |
| JP | 11-005023 | 1/1999 |
| JP | 11-028467 | 2/1999 |
| JP | 11-076769 | 3/1999 |
| JP | 11-156166 | 6/1999 |
| JP | 11-165200 | 6/1999 |
| JP | 11-333265 | 7/1999 |
| JP | 11-033365 | 9/1999 |
| JP | 11-033367 | 9/1999 |
| JP | 11-302438 | 11/1999 |
| JP | 11-319501 | 11/1999 |
| JP | 11-319507 | 11/1999 |
| JP | 2000-000439 | 1/2000 |
| JP | 2000070684 A | 3/2000 |
| JP | 2000-185220 | 4/2000 |
| JP | 2000-157850 | 6/2000 |
| JP | 2000-233020 | 8/2000 |
| JP | 2000-237548 | 9/2000 |
| JP | 2000-300968 | 10/2000 |
| JP | 2000-317276 | 11/2000 |
| JP | 2001-009246 | 1/2001 |
| JP | 2001-070967 | 3/2001 |
| JP | 2001-079366 | 3/2001 |
| JP | 2001-079367 | 3/2001 |
| JP | 2001-104760 | 4/2001 |
| JP | 2001-179059 | 7/2001 |
| JP | 2001-190937 | 7/2001 |
| JP | 2001-190938 | 7/2001 |
| JP | 2001-205055 | 7/2001 |
| JP | 2000-342932 | 12/2002 |
| JP | 2003-053160 | 2/2003 |
| JP | 2003047830 A * | 2/2003 |
| JP | 2003-062436 | 3/2003 |
| JP | 2003-135935 | 5/2003 |
| JP | 2004-230280 | 8/2004 |
| JP | 05-279447 A | 10/2005 |
| JP | 2005-279447 | 10/2005 |
| JP | 09-192458 | 7/2007 |
| JP | 07-313973 | 5/2010 |
| KR | 2002-0090967 | 12/2002 |
| KR | 2003-033812 | 5/2003 |
| KR | 2003-060625 | 7/2003 |
| KR | 2005-063478 | 6/2005 |
| NL | 1020491 C | 10/2003 |
| NL | 1021197 C | 10/2003 |
| WO | 88-00494 | 1/1988 |
| WO | 88-06200 | 8/1988 |
| WO | 89-00880 | 2/1989 |
| WO | 90-00434 | 1/1990 |
| WO | 91-04783 | 4/1991 |
| WO | 91-16124 | 10/1991 |
| WO | 93-02779 | 2/1993 |
| WO | 93-15827 | 8/1993 |
| WO | 93-23152 | 11/1993 |
| WO | 94-11094 | 5/1994 |
| WO | 95-34424 | 12/1995 |
| WO | 96-07470 A1 | 3/1996 |
| WO | 96-28236 | 9/1996 |
| WO | 96-41676 | 12/1996 |
| WO | 97-06880 | 2/1997 |
| WO | 98-22204 | 5/1998 |
| WO | 98-25694 | 6/1998 |
| WO | 98-28066 | 7/1998 |
| WO | 98-53902 | 12/1998 |
| WO | 99-01207 | 1/1999 |
| WO | 99-59707 | 11/1999 |
| WO | 00-18498 | 4/2000 |
| WO | 00-30742 | 6/2000 |
| WO | WO01/00307 A2 | 1/2001 |
| WO | WO 01/00307 A2 * | 1/2001 |
| WO | WO01/00307 A3 | 1/2001 |
| WO | 01-19414 A1 | 3/2001 |
| WO | 01-32299 | 5/2001 |
| WO | 01-36075 | 5/2001 |
| WO | WO 01/32299 A1 * | 5/2001 |
| WO | 01-45829 A1 | 6/2001 |
| WO | 02-40140 A1 | 5/2002 |
| WO | 03-000389 A2 | 1/2003 |
| WO | 03-013706 A1 | 2/2003 |
| WO | 03-057632 A1 | 7/2003 |
| WO | 03-059495 | 7/2003 |
| WO | 03-068374 A1 | 8/2003 |
| WO | 2004-101120 A1 | 11/2004 |
| WO | 2005-005028 A1 | 1/2005 |
| WO | 2005-021140 A1 | 3/2005 |
| WO | 2005-028086 A1 | 3/2005 |
| WO | 2005-037414 A1 | 4/2005 |
| WO | 2005-077499 A1 | 8/2005 |
| WO | 2005-107929 A | 11/2005 |
| WO | 2006-029456 A1 | 3/2006 |
| WO | WO2006047814 A1 * | 5/2006 |

OTHER PUBLICATIONS

Official Communication Pursuant to Article 94(3) EPC, Application No. 03 747 731.2-1213.
Almulla et al., Desalination, 153 (2002), pp. 237-243.
Anonymous, "*Nonwoven Constructions of Dyneon™ THV and Dyneon™ THE Fluorothermoplastics*", Research Disclosure Journal, Apr. 1999, RD 420013, 2 pages.
Cote et al., *Wat. Sci. Tech.* 38(4-5) (1998), pp. 437-442.
Cote, et al. "A New Immersed Membrane for Pretreatment to Reverse Osmosis" Desalination 139 (2001) 229-236.
Craig, Jones, "Applications of Hydrogen Peroxide and Derivatives," The Royal Society of Chemistry, Cambridge, UK 1999 Chapters 2 and 5.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Dow Chemicals Company, "Filmtec Membranes—Cleaning Procedures for Filmtec FT30 Elements," Tech Facts, Online, Jun. 30, 2000, XP002237568.
Husain, H. et al., "The ZENON experience with membrane bioreactors for municipal wastewater treatment," MBR2: Membr. Bioreact. Wastewater Treat., $2^{nd}$ Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system" Water Research, Elsevier, Amsterdam, NL, vol. 37, No. 5, Mar. 2003.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

MicroC™ —Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

U.S. Appl. No. 60/278,007 filed Mar. 23, 2001.

*Water Encyclopedia*, edited by Jay Lehr, published by John Wiley & Sons, Inc., Hoboken, New Jersey, 2005. Available at http://wwwmrw.interscience.wiley.com/eow/.

White et al., *The Chemical Engineering Journal*, 52 (1993), pp. 73-77.

Wikipedia, "Seawater," available at http://en.wikipedia.org/wiki/Seawater, Jul. 15, 2007.

Yamamoto et al., Water Science Technology, vol. 2, pp., 43-54; 1989.

Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

Zenon, "Proposal for ZeeWeed® Membrane Filtration Equipment System for the City of Westminster, Colorado, Proposal No. 479-99," Mar. 2000, entire eublication.

Supplemental European Search Report dated Jul. 16, 2010 for European Application No. 03747731.2.

\* cited by examiner

BACKWASH METHOD

FIELD OF THE INVENTION

The present invention relates to membrane filtration systems, and more particularly to those systems employing porous or permeable membranes located in a tank or cell open to atmosphere and a backwash method and arrangement therefor.

BACKGROUND ART

Any discussion of the prior art throughout the specification should in no way be considered as an admission that such prior art is widely known or forms part of common general knowledge in the field.

Porous membrane filtration systems require regular backwashing of the membranes to maintain filtration efficiency and flux while reducing transmembrane pressure (TMP) which rises as the membrane pores become clogged with impurities. Typically, during the backwash cycle the impurities are forced out of the membrane pores by pressurised gas, liquid or both into the feed tank or cell. Impurities may also be removed from the membrane surfaces by scouring with gas bubbles. The liquid containing impurities and deposits from the membranes is then drained or flushed from the tank.

The waste liquid displaced from the tank needs to be disposed of or reprocessed, usually in an environmentally safe manner, so any reduction in the volume of such waste liquid is seen as advantageous in terms of environmental impact and cost.

The draining or flushing of the tank, particularly when large arrays of membranes are used also requires time which results in down time of the filtration cycle. In order to reduce this down time large pumping systems are required to quickly drain and refill the tank. Where tanks or cells are arranged in banks and feed is used to refill the tank, a lowering in levels in other cells may be produced during the refill process. This again impinges on operating efficiency of the filtration system.

Further, in filtration systems employing gas bubble scouring of the membranes it has been found advantageous to confine the bubbles as much as possible in the region of the membranes to assist with the scouring process.

Reduction in backwash volume also reduces the volume of chemical cleaning agents required in some systems. This has the two-fold advantage of reducing cost in terms of chemical requirements while also reducing waste disposal problems.

Minimising the footprint of filtration systems is also desirable in terms of space eventually occupied by the filtration plant. Compact systems have lesser impact on the environment and are more acceptable to the market.

The distribution of gas across large membrane module arrays often leads to complex distribution systems and thus it is desirable to reduce the complexity of such systems where possible.

It has been found advantageous to reduce the volume of feed liquid in the filtration cell as well as confine scouring bubbles as much as possible in order to ameliorate the above problems and provide at least some of the advantages outlined above.

DISCLOSURE OF THE INVENTION

The present invention seeks to overcome one or more of the abovementioned problems of the prior art, provide one or more of the advantages outlined above or at least provide a useful alternative.

According to one aspect, the present invention provides a filtration arrangement including one or more membrane modules positioned vertically within a feed tank, each membrane module having one or more membranes positioned therein, an aeration hood having an upper wall and one or more downwardly extending side walls configured to at least partially shroud said membrane modules within said tank, said aeration hood including a number of open-ended tubes, each extending downwardly from said upper wall and forming a respective opening therein, each tube adapted to have at least one of said modules mounted therein and extending through said respective openings in the upper wall so as to at least partially surround an outer periphery of an associated module or modules, one or more aeration openings being provided in each tube at a location spaced from a proximal end of said tube, said aeration hood side wall or walls extending to below the location of said aeration openings in said tubes, and gas providing means for feeding gas into said hood.

In one preferred form, one or more of said aeration hood side walls are formed by side walls of the feed tank with the upper wall being sealingly attached to the side wall so formed.

For preference, the aeration openings are provided at or adjacent the distal end of each tube and the aeration hood side wall or walls extend to or below the downward extent of a distal end of said tubes.

Preferably, each membrane module has an associated tube surrounding an outer periphery thereof. For preference, the openings comprise a number of through holes located around the periphery of each tube and spaced from the distal end of said tube. In one form, the gas providing means may comprise an aeration header located below the aeration hood.

In one preferred form, the at least one module includes a sleeve surrounding the outer periphery to prevent flow of gas therethrough. The sleeve extends part way along the length of the module to define an open region at or adjacent the lower end of the module to allow flow of gas into the module through said open region, and the hood is positioned to shroud the module at the location of the open region such that gas passing through the aeration openings may pass through the open region into the module membranes.

Desirably openings or an open region are also provided at the top of the module to allow escape of the gas from the module and entry of liquid into the module.

According to another aspect, the present invention provides a method of cleaning membrane modules in arrangement according to the above aspect including the steps of:
i) suspending the filtration operation;
ii) displacing feed liquid within the aeration hood to a level below the location of said aeration openings in each tube by feeding gas into said aeration hood while maintaining a liquid seal with the distal end of each tube;
iii) passing said gas through said aeration openings into said tubes and along surfaces of membranes within each membrane module to dislodge accumulated fouling materials therefrom;
iv) recommencing the filtration operation.

BRIEF DESCRIPTION OF THE DRAWING

A preferred embodiment of the invention will now be described, by way of example only, with reference to the accompanying drawings in which.

DESCRIPTION OF THE PREFERRED EMBODIMENT

Figure 1:
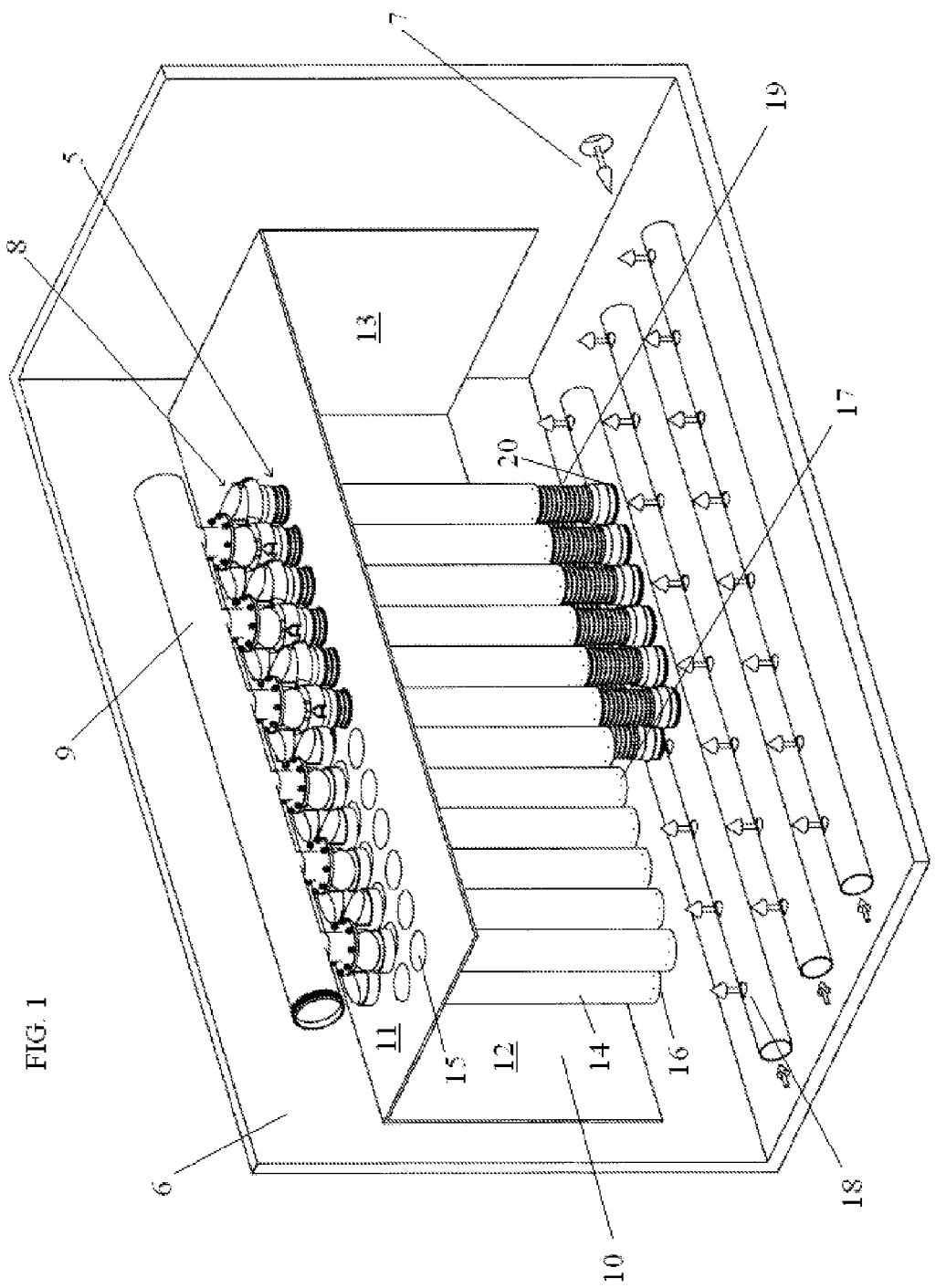
FIG. 1 shows a pictorial perspective view of one preferred embodiment of the invention.

Referring to the FIG. 1 of the drawings, the arrangement consists of a rack of membrane modules 5 suspended in an open feed tank 6 having a feed inlet 7. The modules 5 are suspended from a group manifold 8 which in turn is connected to main filtrate conduit 9 which extends across the top of the tank 6 and connects to each of the manifolds 8. Located and supported within the tank 6 is a hollow structure forming an aeration hood 10 consisting of an upper wall 11 and side walls 12 and 13. The aeration hood 10 has four side walls (two of which have been cutaway to show the internal configuration of the filter arrangement) and is open at its base. It will be appreciated that the walls of the hood can be formed by the sides or walls of the feed tank 6 with the upper wall extending between the tank walls and being sealingly attached thereto (not shown). The aeration hood 10 further includes a number of open-ended tubes 14 corresponding to the number of membrane modules 5 which extend downwardly from the upper wall 11 and form openings 15 therein. Each module 5 is accommodated within a corresponding tube 14 which at least partially surrounds the outer periphery of each module 5. Adjacent the distal end 16 of each tube 14 and spaced around the circumference of the tube 14 is a row of aeration holes 17. The size and number of aeration holes will vary with type and size of module and requirements in terms of maintaining a desired pressure drop to ensure a liquid seal with the distal end 16 of the tube 14. Several rows of holes may be provided along the length of the tube 14 at spaced locations, each row having varying sized holes to control the flow of gas. While holes are shown, a variety of openings may be used including slots extending upwardly from the end of the tube 14. The use of slots may provide self-regulation of the desired pressure drop. A series of aeration lines 18 are provided along the bottom 18 of the feed tank 6.

The aeration and cleaning process according to this embodiment may be described as follows. The filtration process is suspended and backwash commenced with backwash gas, typically air, being supplied from aeration lines 18 under the aeration hood 10 so as to bubble up into the void space between the tubes 14. It will be appreciated that gas could also be fed directly into the aeration hood 10 through a pipe or the like. The gas that bubbles up from the aeration lines 18 displaces feed liquid from within the aeration hood 10. The liquid level in the aeration hood 10 drops until it is below the row of aeration holes 17 near the distal end 16 of the tubes 14. The gas then flows through the holes 17 and into the sides of the module 5 suspended inside the tubes 14. This gas then provides a scrubbing action to scour the membranes within the module 5, whilst the tubes 14 serve to contain the gas within the module 5 thus promoting more effective cleaning.

The distal end 16 of the tube typically extends about 50 to 100 mm below the aeration holes 17 in the tube 14, though it will be appreciated that the aeration holes may be located at any desired location along the length of the tube 14 and several rows of holes may be provided. The pressure drop across the aeration holes 17 is selected to ensure that a liquid seal is maintained between the holes 17 and the end 16 of the tubes 14. A gap 19 may also be provided between the end 16 of the tube 14 and the bottom 20 of the module 5 to allow solids to exit from the bottom 20 of the modules.

Figure 2:
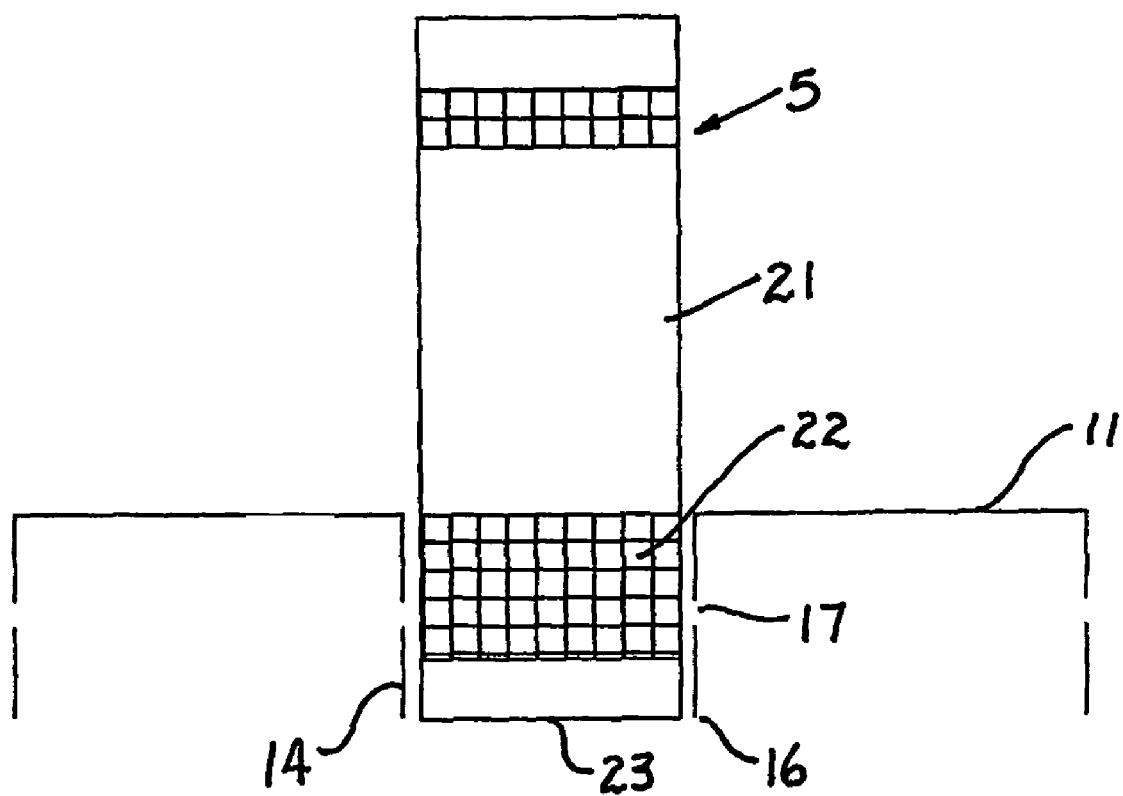
FIG. 2 shows a simplified schematic side elevation view of one module of a further embodiment of the invention.

A further embodiment of hood arrangement is shown in FIG. 2. In this embodiment, the membrane module 5 is provided with a sleeve or wrapping 21 along part of its length which assist with retention of aeration gas within the module 5. The sleeve 21 only extends along a part of the module length leaving an open region 22 adjacent the lower end 23 of the module 5. This open region 22 allows flow of feed, backwash and gas to and from the module 5. In this embodiment, the hood 10 is abbreviated in form and shrouds the module 5 at the location of the open region 22 so that the aeration openings 17 are positioned adjacent the open region 22 to allow free movement of aeration gas into the membranes of the module 5. A further open region or aperture (not shown) is provided at the top of the module 5 to allow the escape of gas and flow of liquid to and from the module.

While the invention has been described in relation in relation to a feed tank open to atmosphere, it will be appreciated that the invention is equally applicable to a closed, pressurized filtration system.

It will be appreciated that further embodiments and exemplifications of the invention are possible without departing from the spirit or scope of the invention described.

The invention claimed is:

1. A filtration arrangement comprising:
    an aeration hood comprising an upper wall and at least one downwardly extending side wall, the at least one side wall at least partially shrouding at least one membrane module vertically positioned within a feed tank, the aeration hood comprising at least one open-ended tube distinct from any side wall of the aeration hood, the at least one open-ended tube extending downwardly from the upper wall, the aeration hood configured and arranged such that a gas fed into the aeration hood will displace feed liquid and lower a level of feed liquid in the aeration hood,
    each of the at least one open-ended tubes having at least one of the at least one membrane modules mounted therein, at least one of the at least one membrane modules in fluid communication with an interior of the feed tank through a lower end of the at least one open-ended tube,
    at least one aeration inlet in a wall of the at least one open-ended tube, and
    the at least one downwardly extending side wall extending to below the location of the at least one aeration inlet in the wall of the at least one open-ended tube.

2. The filtration arrangement according to claim 1, wherein at least one of the aeration hood side walls is formed by a side wall of the feed tank with the upper wall being sealingly attached to the at least one aeration hood side wall.

3. The filtration arrangement according to claim 1, wherein the at least one aeration inlet is disposed adjacent to a lower end of the at least one open-ended tube.

4. The filtration arrangement according to claim 1, wherein each of the at least one membrane modules is mounted in a corresponding open-ended tube.

5. The filtration arrangement according to claim 1, wherein the at least one aeration inlet is shaped as a slot.

6. The filtration arrangement according to claim 1, further comprising an aeration header located below the aeration hood.

7. The filtration arrangement according to claim 1, wherein the at least one side wall extends downward to at least a downward extent of a lower end of the at least one open-ended tube.

8. The filtration arrangement according to claim 5, wherein the at least one aeration inlet is spaced adjacent to a lower end of the at least one open-ended tube.

9. The filtration arrangement according to claim 1, wherein the at least one aeration inlet is shaped as an open-ended slot extending upwardly from a lower end of the at least one open-ended tube.

10. The filtration arrangement of claim 1, wherein the at least one aeration inlet in the wall of the at least one open-ended tube is at a location spaced from the upper end of the at least one open-ended tube.

11. A filtration arrangement comprising:
at least one membrane module positioned vertically within a feed tank;
a sleeve surrounding a periphery of the at least one membrane module, the sleeve extending partially along a length of the at least one membrane module, and having an open region adjacent to a lower end of the at least one membrane module;
an aeration hood positioned within the feed tank, distinct from the sleeve, positioned to shroud the at least one membrane module at the location of the open region, the aeration hood configured and arranged such that a gas fed into the aeration hood will displace feed liquid and lower a level of feed liquid in the aeration hood;
at least one aeration opening in a wall of the aeration hood positioned adjacent to the open region, the aeration hood constructed and arranged to direct a gas through the at least one aeration opening and into an interior of the sleeve through the open region upon displacement of the feed liquid in the aeration hood; and
at least one aeration outlet in the sleeve above an upper wall of the aeration hood.

12. The filtration arrangement of claim 10, wherein the open region is defined by at least one opening in the sleeve.

13. A water treatment system, comprising:
an aeration hood submerged in water to be treated, the aeration hood comprising an upper wall with an opening;
a tube distinct from any side wall of the aeration hood at least partially submerged in the water to be treated, the tube having a first open end sealingly secured to the upper wall at the opening; and
a membrane module disposed within the tube, the tube extending part way along the length of the membrane module and defining an open region adjacent a lower end of the membrane module, the open region comprising a portion of the lower end of the membrane module extending from a lower end of the tube, the membrane module in fluid communication with the water to be treated through the opening in the upper wall.

14. The water treatment system of claim 13, further comprising an aeration header submerged below the aeration hood.

15. The water treatment system of claim 13, wherein the tube comprises at least one aeration inlet disposed at a tube wall thereof.

16. The water treatment system of claim 15, wherein the membrane module is in fluid communication with water to be treated within the aeration hood through the at least one aeration inlet.

17. The water treatment system of claim 15, wherein the membrane module is in fluid communication with air in the aeration hood through the at least one aeration inlet.

18. The water treatment system of claim 17, wherein the tube has a second open end in fluid communication with the water to be treated within the aeration hood.

19. The water treatment system of claim 18, wherein at least one aeration opening is disposed proximate the second open end.

20. A method of cleaning a membrane module disposed in a tank comprising:
immersing in feed liquid a filtration arrangement comprising an aeration hood shrouding the membrane module, the aeration hood comprising an open-ended tube distinct from any side wall of the aeration hood extending downwardly from an upper wall of the aeration hood, the open-ended tube partially enclosing the membrane module, a portion of a lower end of the membrane module extending from a lower end of the open-ended tube, the open-ended tube comprising an aeration inlet in a wall of the open-ended tube at a location spaced from an upper end thereof;
lowering a liquid level in the aeration hood by displacing feed liquid within the aeration hood with a gas; and
passing the gas through the aeration inlet into a volume enclosed by the open-ended tube.

21. The method of cleaning the membrane module of claim 20, further comprising maintaining a liquid seal at a lower end of the tube.

22. The method of cleaning the membrane module of claim 21, further comprising maintaining a pressure drop across the aeration inlet sufficient to maintain the liquid seal.

23. The method of cleaning the membrane module of claim 20, further comprising withdrawing permeate through the membrane module.

24. The method of cleaning the membrane module of claim 20, wherein the act of passing gas through the aeration inlet comprises scouring the membrane module with gas passed through the aeration inlet.

25. The method of claim 20, wherein displacing the feed liquid within the aeration hood with a gas comprises displacing the feed liquid to a level below the location of the aeration inlet.

* * * * *